(12) United States Patent  
Kishimoto et al.

(10) Patent No.: US 6,266,122 B1
(45) Date of Patent: Jul. 24, 2001

(54) LIQUID CRYSTAL DISPLAY DEVICE AND METHOD FOR MANUFACTURING THE SAME

(75) Inventors: Katsuhiko Kishimoto; Kenji Hamada, both of Nara-ken; Masato Imai, Gifu-ken, all of (JP)

(73) Assignees: Sharp Kabushiki Kaisha, Osaka; Sony Corporation, Tokyo, both of (JP)

( * ) Notice: Subject to any disclaimer, the term of this patent is extended or adjusted under 35 U.S.C. 154(b) by 0 days.

(21) Appl. No.: 09/329,237

(22) Filed: Jun. 10, 1999

(30) Foreign Application Priority Data

Jun. 30, 1998 (JP) .................................... 10-185495

(51) Int. Cl.⁷ .......................... G02F 1/1339; G02F 1/13; G02F 1/1337
(52) U.S. Cl. ......................... 349/156; 399/178; 399/123
(58) Field of Search ................... 349/156, 155, 349/178, 123

(56) References Cited

U.S. PATENT DOCUMENTS 4,490,015 * 12/1984 Kawarada et al. ................. 349/178
5,668,651 * 9/1997 Yamada et al. ...................... 349/156
5,726,728 * 3/1998 Kondo et al. ........................ 349/156
6,061,117 * 5/2000 Horie et al. .......................... 349/156

FOREIGN PATENT DOCUMENTS

| 6-301015 | 10/1994 | (JP) . |
| 7-120728 | 5/1995 | (JP) . |
| 9-197384 | 7/1997 | (JP) . |
| 10-186330 | 7/1998 | (JP) . |

* cited by examiner

*Primary Examiner*—Toan Ton
(74) *Attorney, Agent, or Firm*—Nixon & Vanderhye P.C.

(57) ABSTRACT

A liquid crystal display device of the present invention includes: a first substrate and a second substrate; and a liquid crystal layer interposed between the first substrate and the second substrate. The first substrate includes a polymer wall formed of transparent resin, the liquid crystal layer includes a plurality of liquid crystal regions partitioned by the polymer wall, and liquid crystal molecules in the plurality of liquid crystal regions are aligned in axial symmetry, with respect to an axis in a direction substantially perpendicular to a surface of the first substrate.

11 Claims, 11 Drawing Sheets

Observed in black

FIG. 9B $$V_{LC} = \frac{V}{1 + C_{LC}(1/C_p + 1/C_g)}$$

$$C = \varepsilon S/d$$

$$V_{LC} = \frac{V}{1 + \frac{\varepsilon_{LC}}{d_{LC}}\left(\frac{d_p}{\varepsilon_p} + \frac{d_g}{\varepsilon_g}\right)}$$

PRIOR ART

*PRIOR ART*

LIQUID CRYSTAL DISPLAY DEVICE AND METHOD FOR MANUFACTURING THE SAME

BACKGROUND OF THE INVENTION

1. Field of the Invention

The present invention relates to a liquid crystal display device and a method for manufacturing the same. In particular, the present invention relates to a liquid crystal display device having liquid crystal molecules axially symmetrically aligned within a liquid crystal region partitioned by a polymer wall.

2. Description of the Related Art

Conventionally, a TN (twisted nematic) type or a STN (super-twisted nematic) type using a nematic liquid crystal is used as a display device employing an electro-optic effect. A technique of widening a viewing angle of such a liquid crystal display device has been developed.

As one suggested technique of widening a viewing angle of the TN-type liquid crystal display device, Japanese Laid-Open Publication Nos. 6-301015 and 7-120728 disclose a so-called ASM (Axially Symmetrically aligned Microcell) mode, in which a liquid crystal display device has liquid crystal molecules axially symmetrically aligned within a liquid crystal region partitioned by polymer walls. The liquid crystal region substantially surrounded by the polymer wall is typically formed for each picture element. In a liquid crystal display device of this mode, the liquid crystal molecules are axially symmetrically aligned, so that there are a few changes in contrast regardless of the direction in which a viewer sees a screen of the liquid crystal display device. Thus, it has a wider viewing angle.

The ASM-mode LCD disclosed by the aforementioned publications is produced by a polymerization induced phase separation of a mixture containing a polymerizable material and a liquid crystal material.

Figure 10A:
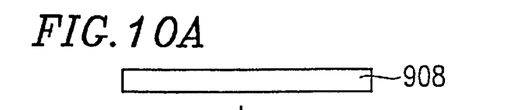
FIGS. 10A to 10I is a diagram illustrating a method for manufacturing a conventional ASM-mode liquid crystal display device.

A method for manufacturing the conventional ASM-mode liquid crystal display device will be described with reference to FIGS. 10A to 10I. First, a substrate is prepared by forming a color filter and an electrode on one surface of a glass substrate 908 (FIG. 10A). Note that for simplicity the electrode and the color filter formed on the glass substrate 908 are not shown. A method for forming the color filter will be described later.

Figure 10B:
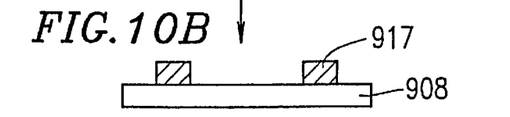

Next, on the surface of the glass substrate 908 where the electrode and the color filter are formed, polymer walls 917 for aligning liquid crystal molecules in axial symmetry is formed in a lattice pattern, for example (FIG. 10B). After a photosensitive resin material is spin-coated, it is exposed through a photomask having a predetermined pattern and developed. As a result, the polymer walls in a lattice pattern are formed. The photosensitive resin material may be either a negative-type or a positive-type. A step of forming an additional resist film is added, but it can be formed by using a resin material with no photosensitivity.

Figure 10C:
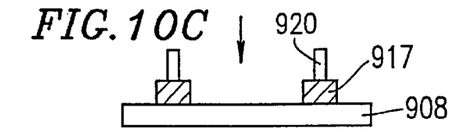

On a top portion of each of the resultant polymer walls 917, a pillar-like protrusion 920 is separately formed by patterning (FIG. 10C). Like the polymer walls 917, the pillar-like protrusions 920 are also formed by exposing and developing a photosensitive resin material.

Figure 10D:
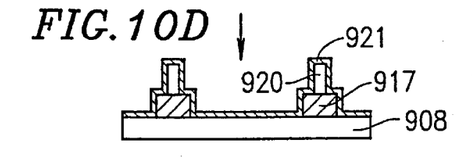
Figure 10E:
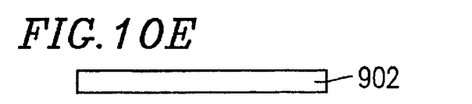
Figure 10F:
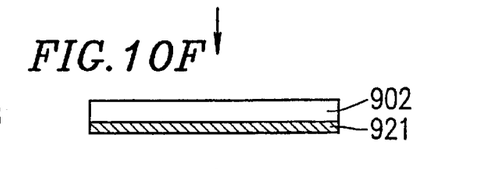

The surface of the glass substrate 908 having the polymer walls 917 and the pillar-like protrusions 920 is coated with a vertical alignment agent 921 such as polyimide (FIG. 10D). Separately, a glass counter substrate 902 with an electrode formed thereon is also coated with a vertical alignment agent 921 (FIGS. 10E and 10F).

Figure 10G:
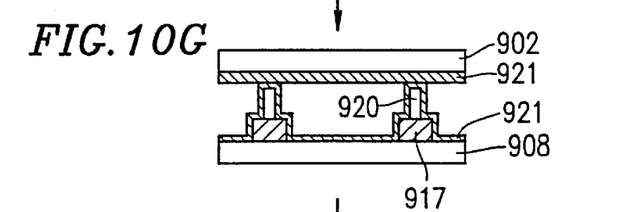

A liquid crystal cell is formed by attaching the two resultant substrates to each other so that the surfaces having the electrodes face each other (FIG. 10G). A gap between two substrates (i.e., a cell gap (a thickness of a liquid crystal layer)) is defined as a sum of the polymer wall 917 and the pillar-like protrusion 920.

Figure 10H:
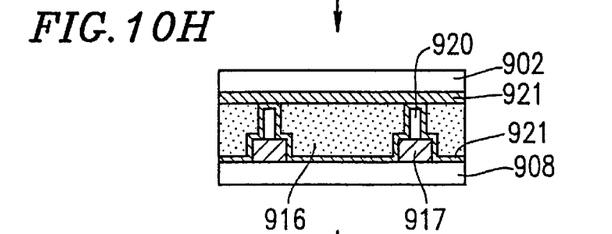
Figure 10I:
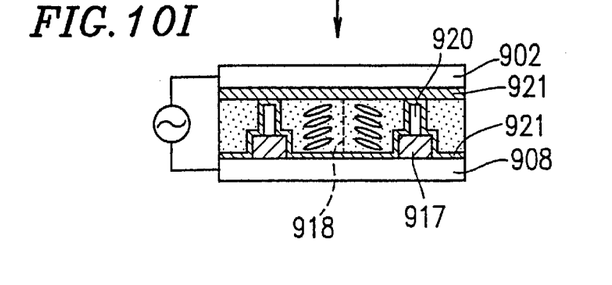

A liquid crystal material is injected into a gap of the resultant liquid crystal cell by a vacuum injection method, for example (FIG. 10H). In the end, by applying a voltage between the opposing electrodes, for example, the crystal molecules within the liquid crystal region 916 are axially symmetrically aligned (FIG. 10I). The liquid crystal molecules within the liquid crystal region 916 partitioned by the polymer walls 917 are symmetrically aligned with respect to an axis 918 (perpendicular to both substrates) represented by a broken-line in FIG. 10I.

Figure 11:
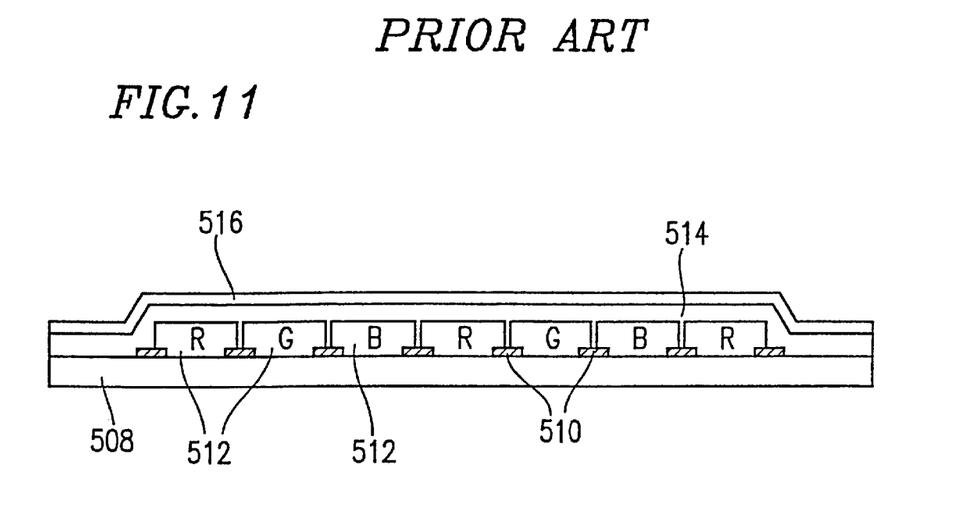
FIG. 11 is a cross-sectional view illustrating a conventional color filter substrate.

FIG. 11 is a cross-sectional view illustrating a structure of a conventional color filter. On a glass substrate 508, a black matrix (BM) 510 for blocking light from being transmitted through gaps between colored portions, and colored resin layers 512 of red, green, and blue (R, G, B) corresponding to respective picture element are formed. An over-coat (OC) layer 514 of acrylic resin, epoxy resin, or the like, with a thickness of about 0.5–2.0 $\mu$m is formed over the BM 510 and the colored resin layer 512 in order to improve smoothness, for example. In addition, an indium tin oxide (ITO) layer 516, which is a transparent signal electrode, is formed on the OC layer 514. The BM is generally composed of metal chrome having a thickness of about 100–150 nm. Resin materials colored with dyes or pigments are used for the colored resin layer 512, and a thickness of this layer is generally about 1–3 $\mu$m.

As a method for forming a color filter, a photosensitive colored resin layer formed on a substrate is patterned by using a photolithography method. For example, a red (R), green (G), and blue (B) color filter can be formed when photosensitive resin layers of respective colors are formed, exposed, and developed (three times in total) by employing the photosensitive resin materials of the respective colors. In order to form a photosensitive colored resin layer, a substrate may be spin-coated with a liquid photosensitive colored resin material (which is diluted with a solvent). Alternatively, a photosensitive colored resin material may be transferred onto the substrate in the form of a dry film. By manufacturing the aforementioned liquid crystal display device of the ASM mode by using the color filter, a color liquid crystal display device having a wide viewing angle characteristic can be obtained.

However, the inventors of the present invention have found the following problems in the conventional ASM-mode liquid crystal display device and the method for manufacturing the same.

In the conventional ASM-mode liquid crystal display device, while it is possible to obtain a wide viewing angle characteristic, the brightness of the display device is reduced because the polymer walls reduce the light transmission. Moreover, the liquid crystal molecules present on the polymer walls in the conventional liquid crystal display device cannot contribute to display of images, so that the transmittance of the liquid crystal display device is reduced. In addition, the axial symmetry alignment of the liquid crystal molecules in the vicinity of the polymer walls is disturbed, thereby causing flickers in images (e.g., light leakage) in a black display.

In addition, when the above-described ASM-mode liquid crystal display device and the method for manufacturing the same are applied to a plasma-addressed liquid crystal display, the following problems arise. In a plasma-addressed liquid crystal display device, a plasma cell portion and a liquid crystal cell portion, which form a switching portion, have different heat history during the manufacturing steps (typically, 500° C. for the plasma cell, and 200° C. for the liquid crystal cell). Accordingly, difference in dimension resulting from heat contraction between both cells also varies. Thus, it is difficult to exactly align plasma electrodes with ITO electrodes. In view of this, a structure which eliminates the need of such a difficult alignment process has been employed (also known as an alignment-free structure). When the plasma-addressed liquid crystal display device and the ASM-mode are combined with the alignment-free structure, polymer walls (conventionally made from a black material) which are often formed within the aperture of each pixel in order that liquid crystal molecules are aligned in axial symmetry. As a result, the aperture ratio is reduced in comparison to the conventional TN-type ASM-mode liquid crystal display device. This may further reduce the brightness of the display.

Furthermore, when black photosensitive resin is applied over the entire surface of a substrate for forming the polymer walls, alignment marks for aligning become difficult to see. As a result, it becomes impossible to achieve accurate alignment during the patterning process, which makes it impossible to form the polymer walls in desired positions. In order to solve this problem, the black photosensitive resin covering the alignment marks may be wiped off, although it makes the manufacturing process more complicated. As an alternative solution, it is possible to apply the black photosensitive resin so as not to cover the alignment marks. For example, the black photosensitive resin maybe selectively applied onto a substrate by employing a roll-coater. However, in comparison to the spin-coating method for applying the resin over the entire surface of the substrate, the method employing the roll-coater is inferior in production of a uniformly thick layer. As described above, it was difficult to form the polymer walls in the desired positions without making the manufacturing process more complicated or degrading the accuracy of the process.

Moreover, in the method for manufacturing the conventional ASM-mode liquid crystal display device, the polymer walls formed on the substrate may interfere with injection of the liquid crystal material in the gap of the liquid crystal cell. As a result, a time required to inject the liquid crystal material becomes longer, thereby decreasing throughput.

SUMMARY OF THE INVENTION

According to one aspect of this invention, a liquid crystal display device includes: a first substrate and a second substrate; and a liquid crystal layer interposed between the first substrate and the second substrate. The first substrate includes a polymer wall formed of transparent resin, the liquid crystal layer includes a plurality of liquid crystal regions partitioned by the polymer wall, and liquid crystal molecules in the plurality of liquid crystal regions are aligned in axial symmetry, with respect to an axis in a direction substantially perpendicular to a surface of the first substrate.

In one embodiment of the invention, the polymer wall has a side surface which is inclined with respect to the surface of the first substrate.

In another embodiment of the invention, an inclination angle of the side surface of the polymer wall which is inclined with respect to the surface of the first substrate is in a range of about 3° to about 45°.

In still another embodiment of the invention, the liquid crystal layer has a liquid crystal material with a negative dielectric anisotropy.

In still another embodiment of the invention, a pillar-like protrusion is provided on at least a part of the polymer wall on the liquid crystal layer side. A gap between the first and second substrates is defined by the polymer wall and the pillar-like protrusion. A height of the polymer wall is lower than a height of the pillar-like protrusion.

According to another aspect of this invention, a method for manufacturing a liquid crystal display device is provided. The liquid crystal display device includes a first substrate and a second substrate, and a liquid crystal layer interposed between the first substrate and the second substrate. The liquid crystal layer includes a plurality of liquid crystal regions partitioned by a polymer wall. The method includes the steps of forming a transparent resin layer on the first substrate, and patterning the transparent resin layer for forming the polymer wall.

In one embodiment of the invention, the transparent resin layer is a layer of photosensitive transparent resin. A photolithography method is used to form the polymer wall.

Hereinafter, the function of the present invention will be described.

According to the present invention, a polymer wall for aligning liquid crystal molecules in axial symmetry is formed of a transparent material. Thus, the liquid crystal molecules aligned on the polymer wall are allowed to contribute to display of images. As a result, it becomes possible to significantly improve the brightness of the display when compared to a case where the polymer wall is not transparent.

In addition, when the polymer wall has side surfaces inclined with respect to a surface of a substrate, disturbance in alignment of the liquid crystal molecules present in the vicinity of the polymer wall along the periphery of a liquid crystal region become unlikely to occur. In addition, it becomes possible to substantially eliminate the light leakage along the periphery of the liquid crystal region. Consequently, it is possible to achieve a higher contrast in black display, whereby the display quality is improved.

By prescribing the inclined side surfaces of the polymer wall at angles in a range of about 3° to about 45°, it is possible to realize stable axially symmetric alignment. Moreover, by prescribing the inclination angle to be relatively small, it is possible to lower the height of the polymer wall.

By lowering the height of the polymer wall, it is possible to suppress an attenuation of light transmitted through portions of the transparent polymer wall. As a result, the transmittance is improved, thereby further improving the brightness of the display.

When the present invention is applied to a plasma-addressed liquid crystal display device, in particular, a voltage applied to the liquid crystal layer becomes higher as the height of the polymer wall gets lower because of an influence of an intermediate layer (a dielectric sheet with a thickness of about 50 $\mu$m) positioned between a plasma cell and a display cell. By prescribing a ratio of the height of the polymer wall to a thickness of the entire liquid crystal cell to be sufficiently small, a voltage-transmittance characteristic of a liquid crystal within a region surrounded by the polymer wall and a voltage-transmission characteristic of a liquid crystal on the polymer wall become closely similar to each other. As a result, contribution of the liquid crystal molecules on the polymer wall to the brightness of the display can be increased.

Thus, the invention described herein makes possible the advantages of (1) providing a liquid crystal display device which has a wide viewing angle characteristic with a sufficient brightness; and (2) providing a method for manufacturing such a liquid crystal display device.

These and other advantages of the present invention will become apparent to those skilled in the art upon reading and understanding the following detailed description with reference to the accompanying figures.

BRIEF DESCRIPTION OF THE DRAWINGS

FIGS. 2A to 2D illustrate an operation principle of an ASM-mode liquid crystal display device according to the present invention, wherein

FIGS. 8A and 8B are schematic diagrams illustrating a display cell used in a plasma-addressed liquid crystal display in Embodiment 2 of the present invention, wherein

FIGS. 9A and 9B are diagrams illustrating influence of height of polymer walls of a plasma-addressed liquid crystal display device in Embodiment 2 of the present invention, wherein

DESCRIPTION OF THE PREFERRED EMBODIMENTS

Hereinafter, the present invention will be described by way of embodiments with reference to the drawings.

EMBODIMENT 1

Figure 1:
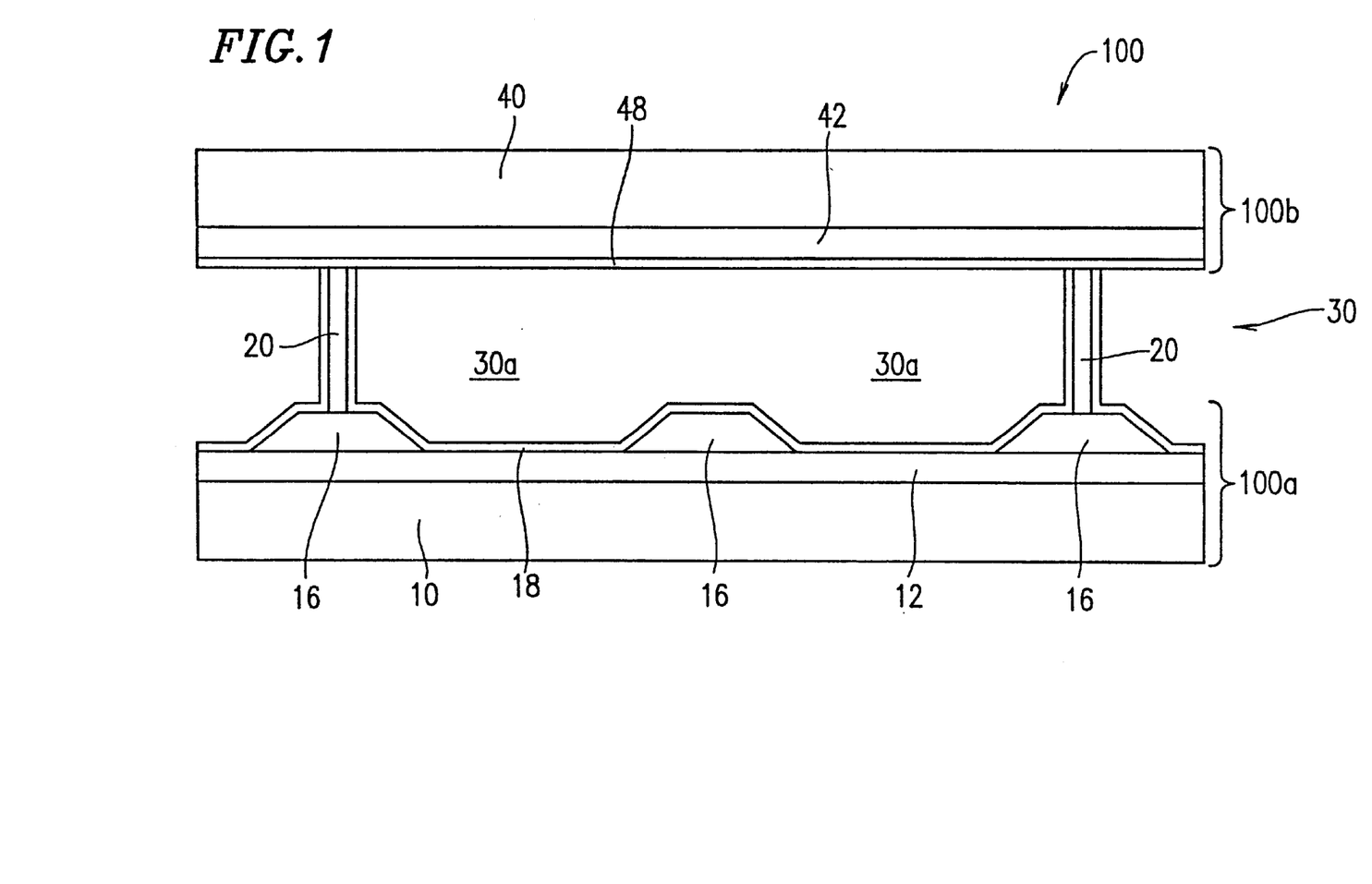
FIG. 1 illustrates a schematic cross-sectional view of a liquid crystal display device in Embodiment 1 of the present invention.

FIG. 1 schematically illustrates a cross-section of a liquid crystal display 100 in Embodiment 1 according to the present invention. In the present embodiment, a structure using a liquid crystal material having a negative dielectric anisotropy, and a vertical alignment film is illustrated, although the present embodiment is not limited thereto.

A liquid crystal display 100 includes a first substrate 100a, a second substrate 100b, and a liquid crystal layer 30 interposed therebetween, having liquid crystal molecules (not shown) with a negative dielectric anisotropy. The first substrate 100a is formed as follows. A first transparent electrode 12 of ITO (Indium Tin Oxide) or the like is formed on a surface of a first transparent substrate 10 (e.g., a glass substrate) on the liquid crystal layer 30 side. On the first transparent electrode 12, transparent polymer walls 16 of transparent resin material are formed. The transparent polymer walls 16 have a side surface inclined with respect to the surface of first transparent substrate 10. The polymer walls 16 partition the liquid crystal layer 30 into a plurality of liquid crystal regions 30a, and have an effect of aligning the liquid crystal molecules within the liquid crystal regions 30a in axial symmetric. In other words, the liquid crystal regions 30a are defined by the polymer walls 16, and the polymer walls 16 substantially surround the liquid crystal regions 30a. The liquid crystal regions 30a are typically formed to correspond to pixel regions. Pillar-like protrusions 20 are selectively formed on the upper surface of the polymer walls 16, so as to define a thickness (i.e., a cell gap)of the liquid crystal layer 30. In the present embodiment, the height of the polymer wall 16 is determined so as to be lower than that of the pillar-like protrusion 20. After the above-mentioned components are formed on the surface of the first substrate 100a on the liquid crystal layer 30 side, a vertical alignment film 18 for aligning the liquid crystal molecules (not shown) within the liquid crystal layer 30 is disposed so as to cover at least the first transparent electrode 12 and the transparent polymer walls 16.

The second substrate 100b is formed as follows. A second transparent electrode 42 of ITO is formed on a surface of a second transparent substrate 40 (e.g., a glass substrate) on the liquid crystal layer 30 side. In addition, a vertical alignment film 48 is disposed so as to cover the second transparent electrode 42.

The polymer walls 16 are disposed, for example, in a lattice pattern so as to correspond to pixel regions. However, the arrangement of the polymer walls 16 is not limited to this. The pillar-like protrusions 20 should be formed with an appropriate density so as to obtain sufficient strength.

As a structure and a driving method of the first electrode 12 and the second electrode 42 for driving the liquid crystal layer 30, known electrode structures and driving methods can be employed. For example, an active matrix type or a simple matrix type is applicable. A plasma-addressed type is also applicable as described later in Embodiment 2 of the present invention. As discussed later in greater detail, in the case of the plasma-addressed type, a plasma discharge channel is provided instead of either the first electrode 12 or the second electrode 42. The first substrate 10 and the second substrate 40 can be switched depending on the types of electrode structures and driving methods employed; i.e., the transparent polymer walls 16 and the pillar-like protrusion 20 may be formed on the second substrate 40.

Figure 2A:
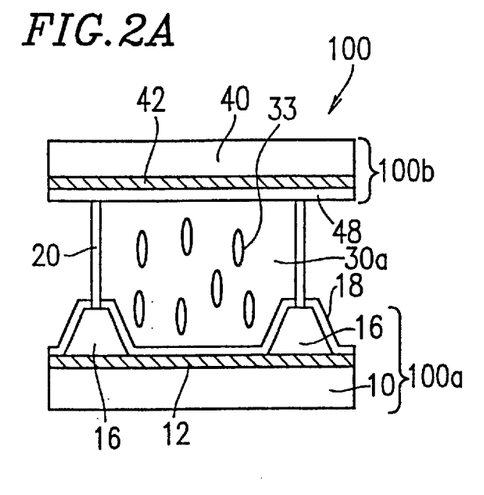
FIG. 2A is a cross-sectional view illustrating the liquid crystal display device in the absence of an applied voltage.
Figure 2B:
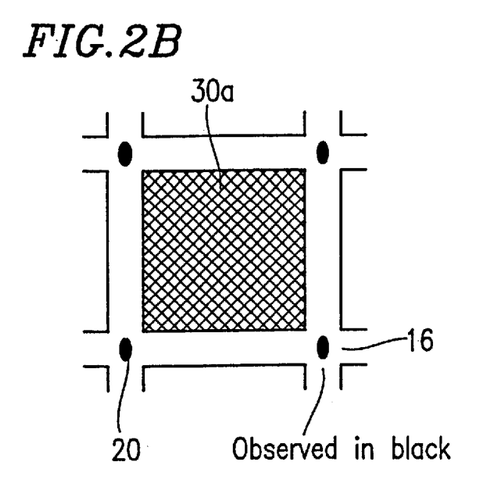
FIG. 2B illustrates the liquid crystal display device in the absence of an applied voltage, observed with a polarization microscope (in a crossed Nicols state)
Figure 2C:
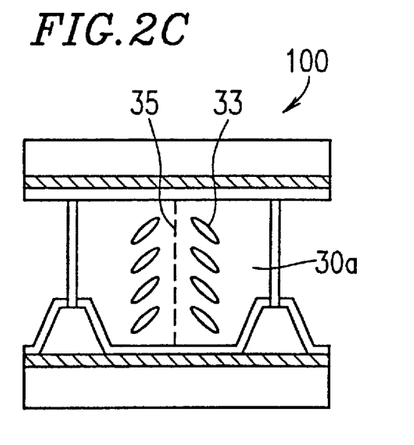
FIG. 2C is a cross-sectional view illustrating the liquid crystal display device in the presence of an applied voltage.
Figure 2D:
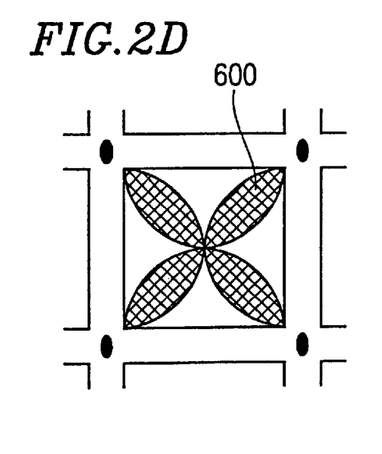
FIG. 2D illustrates the liquid crystal display device in the presence of an applied voltage, observed with a polarization microscope (in a crossed Nicols state).

An operation of the liquid crystal display de15 vice 100 in Embodiment 1 according to the present invention will be described with reference to FIGS. 2A to 2D. In the absence of an applied voltage to liquid crystal regions 30a, as illustrated in FIG. 2A, liquid crystal molecules 33 are aligned by the alignment force (anchoring force) from the vertical alignment films 18 and 48 in a direction substantially perpendicular to the substrates 100a and 100b. When observed with a polarization microscope in a crossed Nicols state, the liquid crystal region 30a in the absence of an applied voltage exhibits a dark field (normally black mode), as illustrated in FIG. 2B. When a voltage for displaying a gray-level is applied, a force acts upon the liquid crystal molecules 33 with a negative dielectric anisotropy and aligns the molecules 33 so that the long axis of the molecules 33 is perpendicular to the direction of the electric field. As a result, the molecules 33 incline from a direction substantially perpendicular to the substrate, as illustrated in FIG. 2C (gray-level display state). At that time, because of the effect of the polymer walls 16, the liquid crystal molecules 33 within the liquid crystal regions 30a are aligned to be symmetric with respect to a central axis 35 represented by a broken-line in the FIG. 2C. When observed with a polarization microscope in a crossed Nicols state, the liquid crystal molecules 33 within the liquid crystal region 30a in this state exhibits an extinction pattern 600 along the polarization axis, as illustrated in FIG. 2D.

Figure 3A:
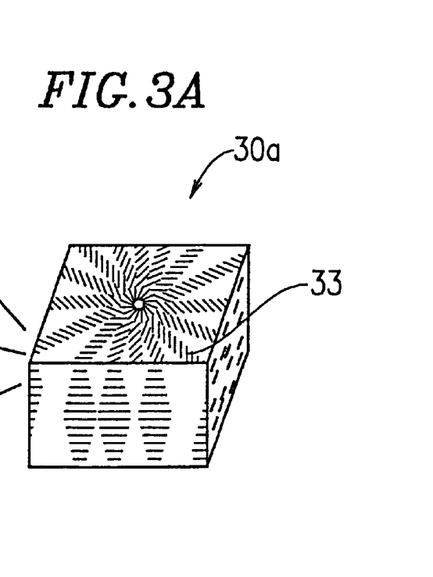
FIGS. 3A and 3B are schematic diagrams each illustrating alignment of liquid crystal molecules in a liquid crystal region.
Figure 3B:
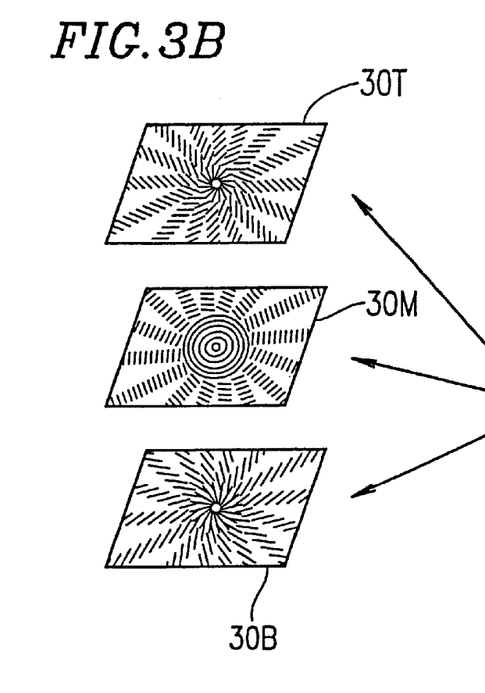

The "axially symmetrical alignment" as used herein may refer to a tangential alignment, a radial alignment, or the like. In addition, a spiral alignment shown in FIGS. 3A and 3B, for example, is also included. The spiral alignment can be obtained by mixing a chiral dopant to the liquid crystal material so as to obtain a twist orientation force. In a top portion 30T and the bottom portion 30B of the liquid crystal regions 30a, the liquid crystal molecules 33 are aligned in a spiral pattern, and in a middle portion 30M, they are aligned in a tangential pattern as shown in FIG. 3B. Therefore, they are twist-aligned with respect to a direction of a thickness of the liquid crystal layer. The central axis of the axial symmetrical alignment substantially matches with a normal direction of the substrate in general.

By aligning the liquid crystal molecules in axial symmetry, viewing angle characteristics can be improved. When the liquid crystal molecules are aligned in axial symmetry, anisotropy of a refractive index of the liquid crystal molecules is averaged in all the azimuthal directions. Therefore, there is no problem of having greatly different viewing angle characteristics depending upon the azimuthal direction, as seen in a gray-level display state of the conventional TN-mode liquid crystal display device. When a horizontal alignment film and a liquid crystal material having a positive dielectric anisotropy are used, it is possible to obtain axial symmetrical alignment even in the absence of an applied voltage. When the axial symmetrical alignment occurs in the presence of an applied voltage, a wide viewing angle characteristic can be obtained.

Hereinafter, a configuration of the polymer walls 16 of the liquid crystal display device of the present invention, and a behavior of the liquid crystal molecules around the walls will be described in detail.

Figure 4:
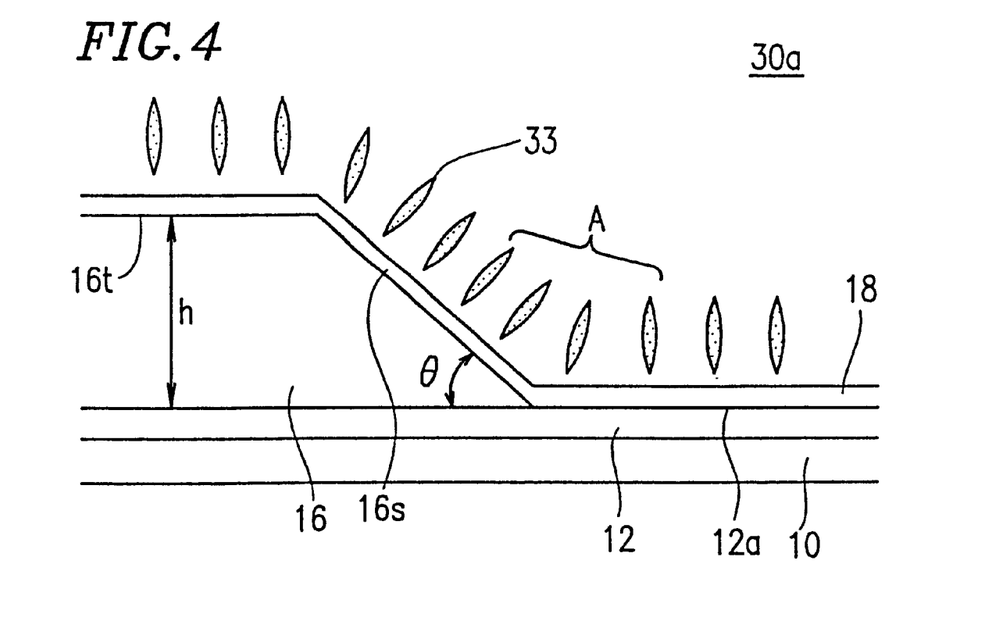
FIG. 4 is a schematic diagram of a model of a liquid crystal region in a liquid crystal display device according to the present invention, illustrating alignment of liquid crystal molecules in the liquid crystal region.

FIG. 4 is a partially enlarged diagram of the vicinity of the polymer walls 16 (i.e., areas around the liquid crystal regions 30a) in the liquid crystal display device shown in FIG. 1. As shown in FIG. 4, due to the alignment force (anchoring force) from the vertical alignment film 18, the liquid crystal molecules 33 are aligned to be perpendicular to: a surface 12a of the first transparent electrode 12 formed on the first transparent substrate 10; a side surface 16s of the polymer wall 16; and a top surface 16t of the polymer wall 16 in the absence of an applied voltage.

In the present embodiment, the polymer walls 16 are formed of a transparent material. The polymer walls 16 are formed, for example, by patterning a film of a transparent resin material (e.g., an acrylic negative-type photosensitive resin) with a thickness of about 0.5 μm and a light transmittance of equal to or more than about 99.5%. Due to such a high transmittance, light that is transmitted through the polymer walls 16 in the direction perpendicular to the substrate passes through the liquid crystal cell with substantially no attenuation in this portion. Accordingly, it is possible to improve the brightness of the front face of the liquid crystal display device. In addition, at least a part of the liquid crystal molecules present on the side surface 16s and the top surface 16t of the polymer wall 16 is allowed to contribute to display of images. Therefore, it is possible to improve an aperture ratio of the liquid crystal display device. The polymer walls 16 have a light transmittance for visible light(wavelength range: about 400 nm–about 800 nm) of preferably about 98% or more, and more preferably about 99% or more. Alternatively, it may be possible to form the walls by patterning transparent resin with no photosensitivity with a resist. However, by using transparent resin with photosensitivity, it is possible to simplify a manufacturing process.

In Embodiment 1 of the present invention, the polymer wall 16 has the side surface 16s at an inclination angle θ (tapering angle θ) with respect to the surface of the substrate. In the absence of an applied voltage, a pretilt angle (with respect to the transparent electrode surface 12a) of a plurality of the liquid crystal molecules 33 present in the vicinity of the region, where the side surface 16s and the transparent electrode surface 12a meet (an area shown by A in FIG. 4), depends on the inclination angle θ of the polymer wall 16. When the inclination angle θ is large, a difference between a pretilt angle (about 90°) of the liquid crystal molecules on the transparent electrode surface 12a and a pretilt angle (about (90−θ)°) of the liquid crystal molecules on the side surface 16s becomes large. As a result, in the area shown by A in FIG. 4, the pretilt angles of the adjacent liquid crystal molecules differ greatly, so that the pretilt angle of the liquid crystal molecules 33 changes abruptly and intermittently. Accordingly, disturbance in the alignment of the liquid crystal molecules 33 in the region occurs. In the present embodiment, however, the inclination angle η of the polymer walls 16 is set at about 45° or less. In this case, the pretilt angle of the liquid crystal molecules 33 adjacent to each other in the area A can change relatively continuously. As a result, disturbance in the alignment of the liquid crystal molecules 33 is less likely to occur, thereby stabilizing an axial symmetric alignment state. Accordingly, it is possible to substantially eliminate the light leakage along the periphery (shown by A)of the liquid crystal regions 30a, thereby increasing a contrast in black display and improving a display quality. Note that if the inclination angle of the polymer walls becomes less than about 3°, a wall surface effect for stably controlling the axial symmetric alignment of the liquid crystal molecules 33 is lost. Accordingly, the inclination angle θ of the polymer walls 16 is preferably equal to or greater than about 3°.

As the inclination angle θ is reduced, it is preferable to reduce the height (h) of the polymer walls 16 to as low as possible. By lowering the height (h) of the polymer walls 16, it is possible to reduce a drop of a net voltage applied to the liquid crystal layer 30 on the polymer walls 16, which is caused by the polymer walls 16. In other words, the voltage applied to the liquid crystal layer 30 on the transparent electrode surface 12a and the voltage substantially applied to the liquid crystal layer 30 on the polymer walls 16 can be made closer. As a result, the voltage-transmittance characteristic of the liquid crystal layer 30 on the polymer walls 16 becomes close to that of the liquid crystal layer 30 on the transparent electrode surface 12a, thereby increasing a proportion of the liquid crystal molecules 30 on the polymer walls 16 contributing to the display. In addition, when the height (h) of the polymerwalls 16 is lowered, the attenuation of the light transmitted through the polymer walls 16 can be reduced. Therefore, the transmittance is improved, which enables display to be even brighter. Preferably, the height of the polymer walls is equal to or less than a half a thickness (a cell gap)of the liquid crystal layer 30.

Hereinafter, a method for manufacturing the liquid crystal display device 100 in Embodiment 1 according to the present invention will be described in detail. The first substrate 100a is formed in the following manner. First, an ITO film is deposited on the first transparent substrate 10 (e.g., a glass substrate). Next, the ITO film is patterned to form the first transparent electrode 12 having a thickness of about 100 nm. Then, acrylic negative-type photosensitive resin (e.g., CT produced by FUJIFILM OLIN CO., LTD.) having a thickness of about 0.5 $\mu$m is applied over the first transparent electrode 12 by a spin coater, and prebaked at about 130° C. for about 120 seconds. After the prebaking process, a resin layer having a thickness of about 0.5 $\mu$m and transmittance of about 99.5% is obtained. In addition, the resin layer is subjected to proximity-exposure with ultraviolet rays by using a photomask having a predetermined polymer wall pattern, and developed. CD (produced by FUJIFILM OLIN CO., LTD.) is used as a developing solution, and development is performed for about 60 seconds. After the resultant substrate is washed and dried, it is postbaked at about 230° C. for about 1 hour. The polymer walls 16 (height: about 0.5 $\mu$m; inclination angle: about 3°; width: about 20 $\mu$m), having inclined side surfaces with respect to the substrate and substantially surrounding the liquid crystal regions 30a, are formed on the first transparent substrate 10. The polymer walls 16 are formed so that the inclination angle of the inclined side surfaces thereof is in a range of about 3° to about 45°. This is achieved by adjusting a gap (i.e., a proxy gap) between the substrate surface and a mask used for the proximity exposure, and by optimizing the prebaking temperature after applying the material. When considering the transmittance, the height of the polymer walls 16 is preferably lowered. Therefore, as seen in the combination of the height of about 0.7 $\mu$m and the inclination angle of 4°, or the height of about 1.0 $\mu$m and the inclination angle of about 5°, for example, it is more preferable to have the inclination angle of less than about 10°.

The size of each liquid crystal region 30a is set at about 160 $\mu$m×about 140 $\mu$m. The pillar-like protrusions 20 are patterned on the polymer walls 16 by a photolithography method using a photosensitive resin (e.g., photosensitive polyimide). A thickness of the photosensitive resin, which is a height of the pillar-like protrusion 20, is set to about 5.5 $\mu$m. After the first transparent electrode 12, the polymer walls 16, and the pillar-like protrusions 20 are all formed on the first transparent substrate 10, JALS-204 (from JSR), or the like, was spin-coated so as to provide the vertical alignment film 18.

The second substrate 100b is formed by: forming an ITO film on the second transparent substrate 40 (e.g., a glass substrate); patterning it to form the second transparent electrode 42 having a thickness of about 100 nm; and spin-coating JALS-204 (produced by JSR) thereabove to form the vertical alignment film 48.

The first substrate 100a and the second substrate 100b formed in the above-mentioned manner are attached to each other. A gap between the first and second substrates 100a and 100b is determined by a sum of the height of the polymer walls 16 formed on the first substrate 100a and the height of the pillar-like protrusions 20 formed to be higher than the polymer walls 16. In the present embodiment, the cell gap is set at about 6 $\mu$m. An n-type liquid crystal material (with a chiral dopant mixed thereto so as to have $\Delta\in=-4.0$ and $\Delta n=0.08$, with a twist angle adjusted to be about 90° within a cell gap of about 6 $\mu$m) is injected into a gap between the first substrate 100a and second substrate 100b. In the present embodiment, the pillar-like protrusions 20 (about 5.5$\mu$m) are formed so as to be sufficiently higher than the polymer walls 16 (about 0.5 $\mu$m). Thus, the frictional resistance of the polymer walls 16 for the injection of the liquid crystal material is reduced, and a time required for the injection process is relatively short, whereby the production throughput is increased.

In the liquid crystal display device 100 in the present embodiment of the present invention, the liquid crystal molecules are preferably aligned in axial symmetry with respect to a single central axis in each of the liquid crystal regions 30a. The following operation is preferably performed in order to form a single central axis in each liquid crystal region 30a.

Figure 5:
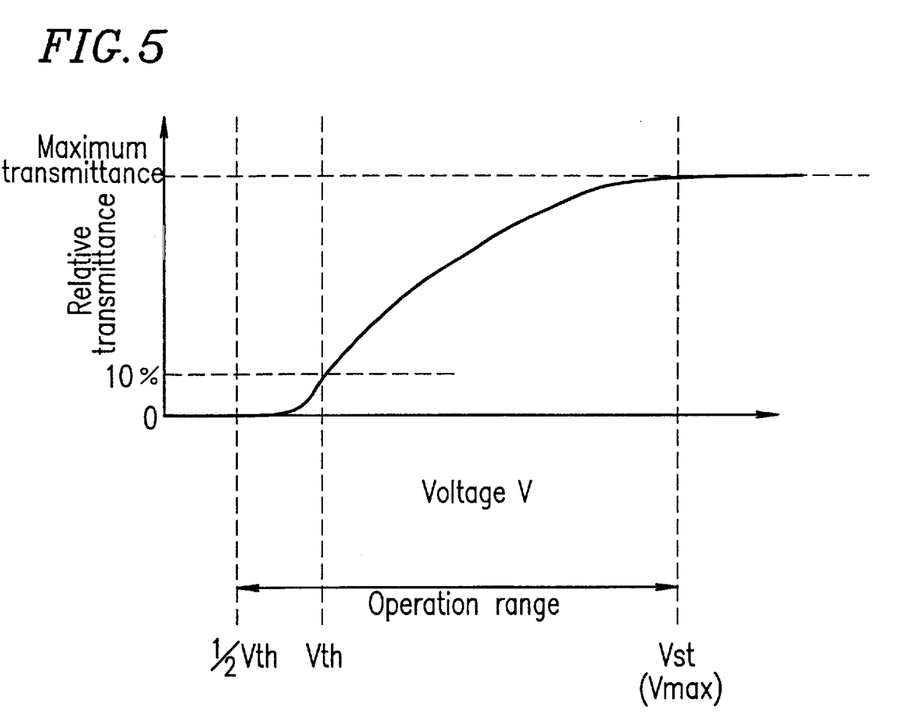
FIG. 5 is a graph illustrating a voltage transmittance curve of a liquid crystal display device of the present invention.

Mere injection of a liquid crystal material in the presence of an applied voltage may result in the formation of a plurality of central axes within each of the liquid crystal regions 30a, and hence a plurality of regions of axially symmetrical alignment within the liquid crystal region 30a. If a plurality of central axes are formed within one liquid crystal region, a voltage-transmission curve shown in FIG. 5 may show hysteresis characteristics, i.e., the same applied voltage may result in different transmittance values depending on whether a voltage is increased or decreased. When a gradually increasing voltage is applied through a liquid crystal cell (into which a liquid crystal material has been merely injected), a plurality of central axes may be formed at first, but after continued application of a voltage at about ½ Vth or greater (Vth: a threshold voltage at which a relative transmittance of about 10% is obtained with respect to the maximum transmittance), the central axes 35 become a single central axis 35 in each of the liquid crystal regions 30a defined by the polymer walls 16. Thus, it is preferable to perform a symmetrical alignment process by applying a voltage of about ½ Vth or greater. Moreover, it is preferable that the liquid crystal display device 100 in Embodiment 1 of the present invention is driven with a voltage in a range from ½ Vth to Vst (Vst: a saturation voltage at which the maximum transmittance is obtained). If the driving voltage is below ½ Vth, a plurality of central axes may be formed, thereby resulting in unstable voltage-transmission characteristic of the device.

Figure 6:
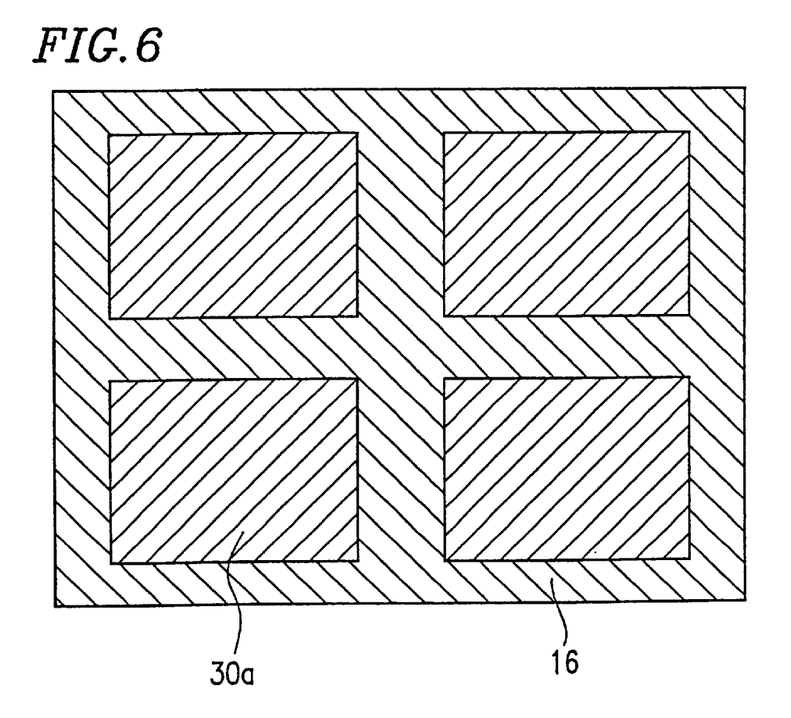
FIG. 6 is a schematic diagram illustrating a liquid crystal cell produced in Embodiment 1 of the present invention, observed with a polarization microscope (in a crossed Nicols state).

FIG. 6 schematically illustrates the liquid crystal regions 30a of an actually produced liquid crystal display device in a transmission mode observed with a polarization microscope (in a crossed Nicols state) in the absence of an applied voltage. The liquid crystal region 30a in the absence of an applied voltage exhibits a dark field (in a normally black mode). In FIG. 6, the polymer wall 16 and the liquid crystal region 30a are distinguished from each other by being hatched in different manners for illustrative purposes, whereby each boundary between the polymer wall 16 and the liquid crystal region 30a is distinctive. In practice, however, the boundary between the polymer wall 16 and the liquid crystal region 30a is generally not distinctive when viewed with a polarization microscope in a crossed Nicols state. As can be seen in FIG. 6, there is no substantial light leakage in a black display state across the display cell, whereby a high contrast ratio is obtained.

EMBODIMENT 2

Figure 7:
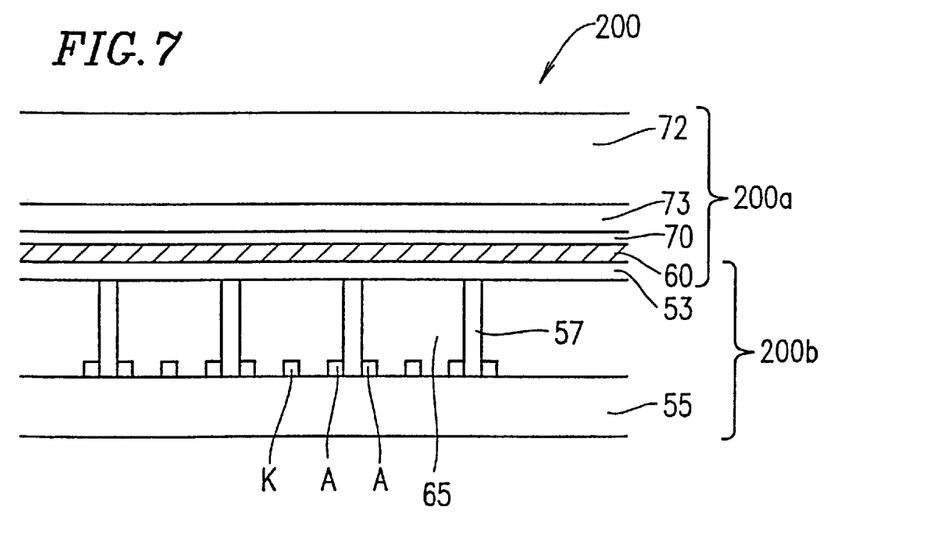
FIG. 7 is a schematic diagram of a plasma-addressed liquid crystal display device in Embodiment 2 of the present invention.

FIG. 7 is a schematic view illustrating a plasma-addressed liquid crystal display device to which the liquid crystal display device in Embodiment 1 is applied. A plasma-addressed liquid crystal display device 200 as shown in FIG. 7 has a flat panel structure including: a display cell 200a for performing pixel-wise display by modulating incident light into output light according to pixel signals; and a plasma cell 200b for scanning (or addressing) the pixels. The display cell 200a and the plasma cell 200b share an intermediate sheet 53. The intermediate sheet 53 functions as a lower substrate of the display cell 200a and as an upper substrate of the plasma cell 200b.

The plasma cell 200b includes a substrate 55, the intermediate sheet 53, and discharge channels 65 surrounded by partition walls 57 and arranged in rows. The plasma cell 200b successively generates plasma discharge to scan the display cell 200a in a linear sequential manner. Each discharge channel 65 has anode electrodes A and a cathode electrode K disposed within a row-shape space between the anode electrodes A. Although not shown in the figures, it is understood that a power source circuit for applying a voltage to the anode electrodes A and the cathode electrode K for generating plasma discharge, and a scanning circuit for controlling the scanning process, etc., are provided separately. The components for driving the plasma-addressed liquid crystal display device 200 may be those components used in a conventional plasma-addressed liquid crystal display device. The liquid crystal display device of a plasma addressed type is disclosed in Japanese Laid-Open Publication No. 4-128265, for example.

The display cell 200a includes signal electrodes 70 arranged in columns so as to substantially cross in a perpendicular manner the discharge channels 65 arranged in rows, thereby defining a pixel at each intersection thereof. Each pixel of the liquid crystal layer 60 is driven with a voltage applied in a linear sequential manner from the discharge channel 65 via the intermediate sheet 53 and a single voltage for applying a pixel signal to the signal electrode 70 in synchronization with the linear sequential scanning, thereby modulating the incident light. The display cell 200a has a structure such that the second substrate 100b of the liquid crystal display device 100 in Embodiment 1 is replaced by the plasma cell 200b.

The plasma cell 200b is constructed by attaching the glass substrate 55 (on which the partition walls 57, the anode electrodes A and the cathode electrodes K have been provided) to the lower surface of the intermediate sheet 53. The display cell 200a is constructed by attaching the glass substrate 72 (on which the signal electrodes 70 and polymer walls (not shown) have been provided) to the upper surface of the intermediate sheet 53. A gap between the glass substrate 72 and the intermediate sheet 53 (a thickness of the liquid crystal layer 60 or the cell gap) is defined by a sum of the polymer walls and the pillar-like protrusions provided on the polymer walls (not shown). The polymer walls and the pillar-like protrusions provided thereon have substantially the same structure as the polymer walls 16 and the pillar-like protrusions 20 in FIG. 1. In Embodiment 2, a color filter layer 73 is provided between the signal electrodes 70 and the glass substrate 72.

Hereinafter, a method for manufacturing the display cell 200a will be described with reference to FIGS. 8A and 8B.

Figure 8A:
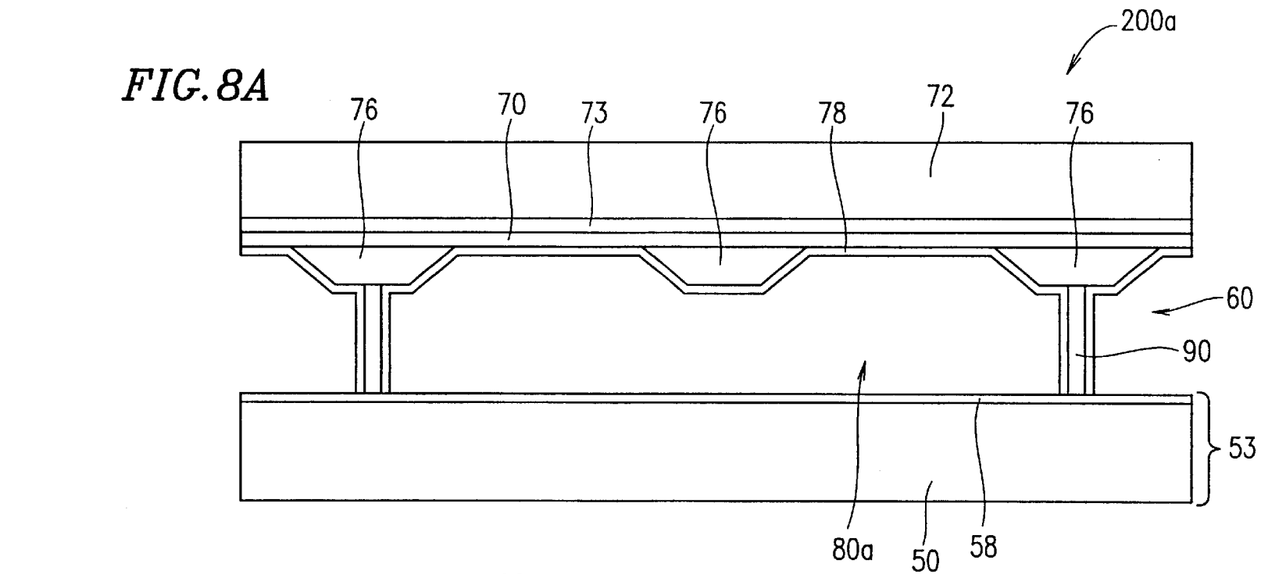
FIG. 8A is a cross-sectional view thereof.
Figure 8B:
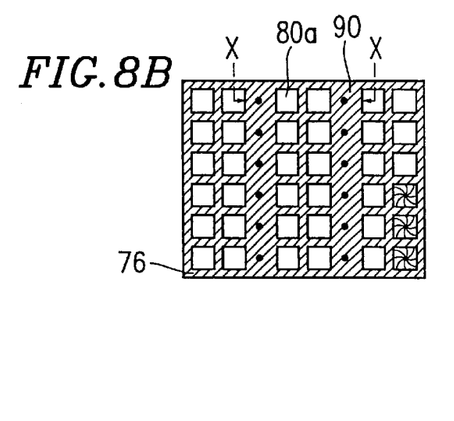
FIG. 8B is a top plan view thereof.

FIG. 8A is a schematic cross-sectional view of the display cell 200a, and FIG. 8B is a plan view thereof. FIG. 8A corresponds to a cross-section taken along X—X in FIG. 8B.

JALS-204 (produced by JSR) is spin-coated on a glass substrate 50 so as to form a vertical alignment film 58, whereby the intermediate sheet 53 is obtained. The transparent electrode 70 of ITO with a thickness of about 100 nm is formed on the glass substrate 72 on which the color filter layer 73 is formed. Next, the polymer walls 76 having tapering portions on their sides, which substantially surround the liquid crystal regions 80a are formed on the glass substrate 72 as shown in FIGS. 8A and 8B in a manner similar to Embodiment 1. The size of the liquid crystal region 80a is set to about 160 $\mu$m×about 140 $\lambda$m. In Embodiment 2, the polymer walls 76 are formed of transparent resin; thus, the alignment marks for positioning the polymer walls 76 remain visible even if the transparent resin is applied over the entire surface, thereby making it possible to exactly position the walls at the time of patterning without increasing the number of manufacturing steps. As a result, the polymerwalls 76 are formed at desired positions.

Next, similar to Embodiment 1, the pillar-like protrusions 90 are formed on the polymer walls 76. The pillar-like protrusions 90 are formed so as to be disposed immediately above regions where a black matrix (not shown) of the color filter layer 73 is formed. By forming the pillar-like protrusions 90 immediately above the regions where the black matrix (not shown) of the color filter layer 73, it is possible to prevent the brightness of the display device from decreasing due to the presence of the pillar-like protrusions 90. As shown in FIG. 8B, the polymer walls 76 and the pillar-like protrusions 90 are formed in Embodiment 2, but the positions of the polymer walls 76 and the pillar-like protrusions 90 are not limited to this.

The vertical alignment film 78 is formed on the glass substrate 72 including the polymer walls 76 and the pillar-like protrusions 90 provided thereon. The resultant display cell 200a and plasma cell 200b are attached to each other via the intermediate sheet 53, and an n-type liquid crystal material (with a chiral dopant mixed thereto so as to have $\Delta\in=-4.0$ and $\Delta=0.08$, with a twist angle adjusted to about 90° within a cell gap of about 6 $\mu$m) is injected as the liquid crystal layer 60, thereby producing a plasma-addressed liquid crystal cell.

A voltage of about 40 volts is applied across the produced display cell, in order to define alignment axes for the axially symmetric alignment. Immediately after the voltage application, a plurality of alignment axes are initially formed. After continued voltage application, only one alignment axis is formed in each liquid crystal region 80a, which then has only one axially symmetric alignment region ("monodomain").

Figure 9A:
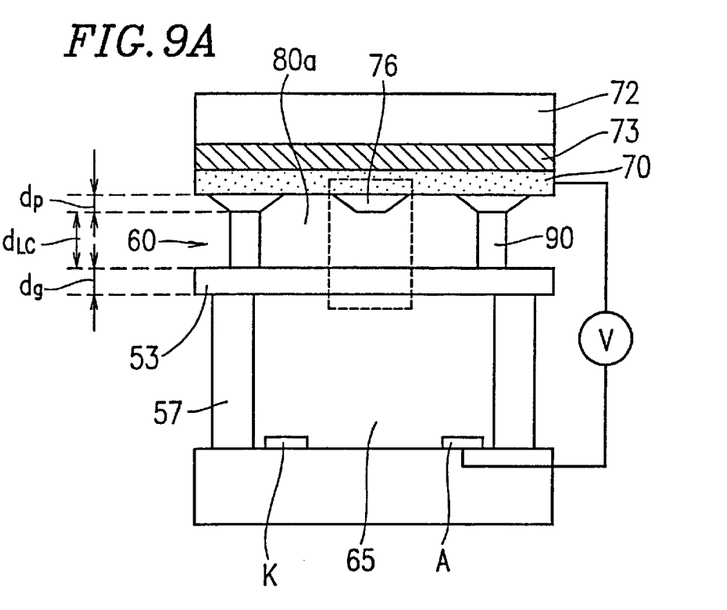
FIG. 9A is a schematic cross-sectional view of a plasma-addressed liquid crystal display device.
Figure 9B:
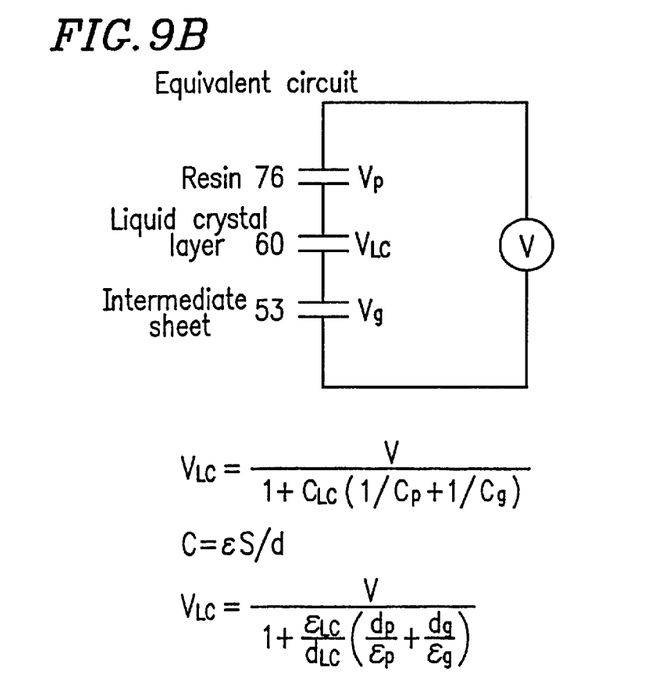
FIG. 9B is a diagram showing an equivalent circuit.

When the present invention is applied to the plasma-addressed type liquid crystal display device, a thickness of the polymer walls 76 influences a display characteristic, in particular. With reference to FIGS. 9A and 9B, it will be described how voltage $V_{LC}$ applied to the liquid crystal layer 60 changes in a case that the height of the polymer walls 76 of the aforementioned plasma-addressed type liquid crystal display is lowered.

$\in_{LC}$, $\in_p$, and $\in_g$ represent dielectric constants of the liquid crystal layer 60, the polymer walls 76, and the intermediate sheet 53, respectively, and $d_{LC}$, $d_p$, and $d_g$ are the respective thicknesses thereof ($d=d_{LC}+d_p$). The dielectric constant is a value unique to each material. When dis fixed, and the height ($d_p$) of the polymerwalls 76 is lowered, the thickness ($d_{LC}$) of the liquid crystal layer 60 on the polymer walls 76 increases relatively, so that the voltage applied to the liquid crystal layer 60 increases. As the height of the polymer walls 76 becomes lower, a voltage applied to the liquid crystal layer 60 thereon gets closer to a voltage applied to a portion including the liquid crystal molecules within the liquid crystal regions 80a aligned in axial symmetry by the polymer walls 76. Accordingly, the voltage-transmittance characteristic of both the portions become similar. As a result, a portion (e.g., on the polymer walls 76) other than the liquid crystal region 80a which is aligned in axial symmetry is allowed to contribute to display when the voltage V applied to the liquid crystal cell is turned on or off. When the inclination angle of the polymer walls 76 is set in a range of about 30 to about 45° as in Embodiment 1, it is possible to eliminate the disturbance in the alignment of the liquid crystal molecules in the vicinity of the polymer walls 76. Therefore, even if the material for forming the polymer walls 76 is transparent, there is no light leakage due to the disturbance of the alignment in the absence of an applied voltage (i.e., by the liquid crystal molecules which are not aligned vertically), thereby improving the brightness of the display device while maintaining a high-contrast ratio.

Polarizing plates are provided on the respective sides of the liquid crystal display cell in a crossed Nicols state, thereby producing the liquid crystal display device. If the liquid crystal region 80a of an actually produced liquid crystal cell in a transmission mode is observed with a polarization microscope (in a crossed Nicols state) in the absence of an applied voltage, no substantial light leakage is observed in a black display state across the entire display cell, and a high contrast ratio is obtained, as shown in Embodiment 1 in FIG. 5. When 80 volts is applied to the liquid crystal cell, the brightness is about 110 nit. Accordingly, the brightness is increased by about 80% compared with the brightness of about 60 nit of the conventional liquid crystal cell whose polymer walls 16 are formed of black resin.

As described above, according to the present invention, it is possible to improve the brightness of the ASM mode liquid crystal display device. Moreover, particularly when the present inventions is applied to the plasma-addressed liquid crystal display device, it is possible to provide the plasma-addressed liquid crystal display device which has brighter display and a higher contrast ratio. In addition, according to the present invention, the number of manufacturing steps does not have to be increased, and accurate alignment is possible, so that a method for manufacturing the liquid crystal display device with good productivity is provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:

a first substrate and a second substrate;

a liquid crystal layer interposed between the first substrate and the second substrate, wherein the first substrate includes a transparent polymer wall formed of transparent resin, the liquid crystal layer includes a plurality of liquid crystal regions partitioned by the polymer wall wherein a greatest height of said polymer wall is substantially less than a thickness of said liquid crystal layer, and liquid crystal molecules in the plurality of liquid crystal regions are aligned in axial symmetry, with respect to an axis in a direction substantially perpendicular to a surface of the first substrate, wherein liquid crystal molecules of said liquid crystal layer are disposed on an upper or top surface of said polymer wall.

2. A liquid crystal display device according to claim 1, wherein the polymer wall has a side surface which is inclined with respect to the surface of the first substrate.

3. A liquid crystal display device according to claim 2, wherein an inclination angle of the side surface of the polymer wall which is inclined with respect to the surface of the first substrate is in a range of about 3° to about 45°.

4. A liquid crystal display device according to claim 1, wherein the liquid crystal layer has a liquid crystal material with a negative dielectric anisotropy.

5. A liquid crystal display device according to claim 1, wherein a pillar-like protrusion is provided on at least a part of the polymer wall on the liquid crystal layer side; a gap between the first and second substrates is defined by the polymer wall and the pillar-like protrusion; and a height of the polymer wall is lower than a height of the pillar-like protrusion.

6. The display device of claim 1, wherein said height of said polymer wall is no greater than half the thickness of said liquid crystal layer.

7. The display device of claim 1, wherein a top or upper surface of said polymer wall is exposed so that liquid crystal molecules of said liquid crystal layer are provided on said top or upper surface of said wall.

8. A liquid crystal display comprising:

first and second substrates;

a liquid crystal layer including liquid crystal molecules disposed between said first and second substrates;

at least one transparent polymer wall formed of transparent resin disposed between said first and second substrates in order to partition said liquid crystal layer into a plurality of liquid crystal regions;

wherein an upper or top surface of said at least one transparent polymer walls is exposed so that liquid crystal molecules of said liquid crystal layer are disposed on said upper or top surface of said polymer wall; and wherein liquid crystal molecules in the plurality of liquid crystal regions are aligned in axial symmetry.

9. The display of claim 8, further comprising a pillar-like protrusion (20) disposed on said top or upper surface of said at least one wall.

10. The display of claim 8, wherein a height of said at least one transparent polymer wall is no greater than half the thickness of said liquid crystal layer.

11. The display of claim 8, further comprising an alignment film provided on said top or upper surface of said at least one wall so that said liquid crystal molecules are provided on said top or upper surface of said wall with said alignment film being located between said liquid crystal molecules and said top or upper surface of said wall.

* * * * *